(12) United States Patent
Aikawa

(10) Patent No.: US 7,658,456 B2
(45) Date of Patent: Feb. 9, 2010

(54) TELEVISION AND RIB STRUCTURE

(75) Inventor: Keisuke Aikawa, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 60 days.

(21) Appl. No.: 11/985,925

(22) Filed: Jan. 29, 2008

(65) Prior Publication Data
US 2009/0189493 A1 Jul. 30, 2009

(51) Int. Cl.
*A47B 81/06* (2006.01)
(52) U.S. Cl. .................... 312/7.2; 348/818; 348/826
(58) Field of Classification Search .............. 312/7.2, 312/257.1, 223.1, 223.2; 348/818, 826, 836, 348/E5.128, E5.129, 789, 825; 361/679.61
See application file for complete search history.

(56) References Cited

U.S. PATENT DOCUMENTS

| 4,360,838 | A | * | 11/1982 | Babicz et al. | ............... 348/826 |
| 5,067,022 | A | * | 11/1991 | Huerre et al. | ............... 348/825 |
| 5,359,421 | A | * | 10/1994 | Maeda | ............... 348/818 |
| 6,166,783 | A | * | 12/2000 | Ahn | ............... 348/836 |
| 6,663,198 | B2 | * | 12/2003 | Sugamura | ............... 312/7.2 |
| 6,693,679 | B1 | * | 2/2004 | Ahn | ............... 348/818 |
| 2004/0212744 | A1 | | 10/2004 | Saitoh | |
| 2004/0223297 | A1 | | 11/2004 | Kobayashi et al. | |

FOREIGN PATENT DOCUMENTS

SE 505288 7/1997

OTHER PUBLICATIONS

The European search report, pursuant to Rule 44a EPC dated Mar. 18, 2008, searched on Mar. 11, 2008.

* cited by examiner

*Primary Examiner*—James O Hansen
(74) *Attorney, Agent, or Firm*—Yokoi & Co., U.S.A., Inc.; Peter Ganjian

(57) ABSTRACT

There is provided a rib structure formed at a predetermined position inside a cabinet and at positions around a display panel housed in a cabinet, the rib structure including a first rib portion that is substantially linear and one end of which is opposed to a side face of the display panel and a second rib portion that is substantially U-shaped and connected to an other end of the first rib portion at a nearly bottom position of the U-shape and two ends of the U-shape being connected to a wall face of the cabinet.

2 Claims, 4 Drawing Sheets

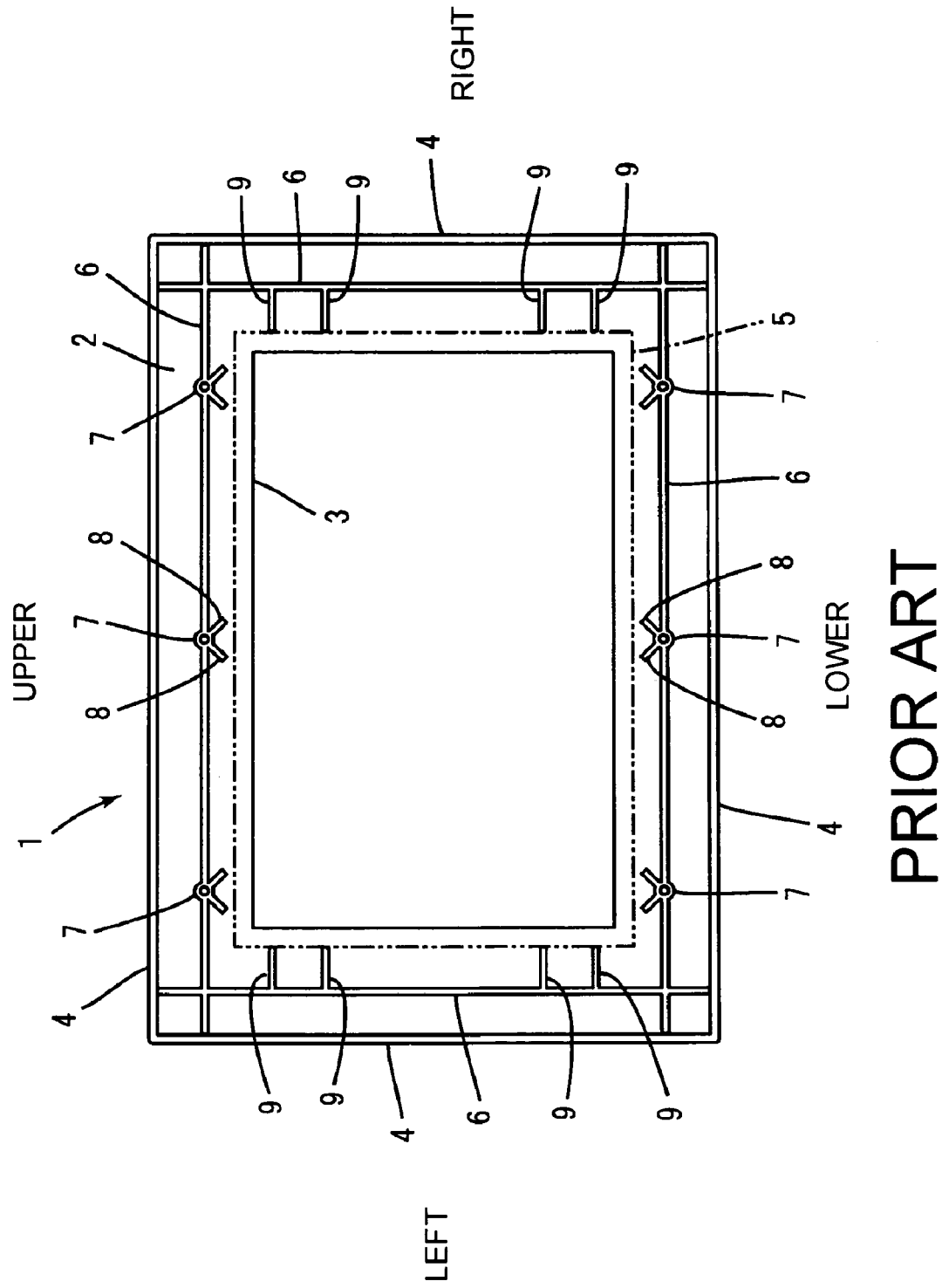

TELEVISION AND RIB STRUCTURE

CROSS-REFERENCES TO RELATED APPLICATIONS

The present application is related to the Japanese Patent Application No. 2006-321728, filed Nov. 29, 2006, the entire disclosure of which is expressly incorporated by reference herein.

BACKGROUND OF THE INVENTION (1) Field of the Invention Background of the Invention The present invention relates to a television and a rib structure.

(2) Description of Related Art

FIG. 4 illustrates a conventional cabinet for a television.

The cabinet for a television is composed of a front cabinet and a rear cabinet. The figure schematically illustrates the inside of the front cabinet 1 as viewed from the rear thereof.

The front cabinet 1 is generally composed of a front face 2 at the substantial center of which an approximately rectangular opening 3 is formed and side faces 4 extending from the front face 2 to the rear side at the upper, lower, left and right edges of the front face 2. In FIG. 4, the front side of the paper surface is taken to be the rear side of the front cabinet 1 (television). In FIG. 4, a two-dot chain line indicates where to house a display panel 5 in the front cabinet 1. The display panel 5 is fixed to the inside of the front cabinet 1 with the screen of the display panel 5 exposed to the outside from the opening 3.

A rib 6 is formed around the periphery of the opening 3 on back side (rear side) of the front face 2 in substantially parallel with the upper, lower, left and right straight lines of the opening 3. A boss 7 and locating rib 9 are formed at several places on the rib 6 respectively. The rib 6, boss 7 and locating rib 9 are uprightly provided from the back side of the front face 2 toward the rear side of the television. A screw hole is formed in the center of boss 7. The display panel 5 is fixed to the front cabinet 1 such that the screw hole formed in the boss 7 is screwed to a screw hole formed in a sheet metal (not shown) fitted on the periphery of the display panel 5. A reinforcing rib 8 for reinforcing the boss 7 extends from the external face of the boss 7. The reinforcing rib 8 is also uprightly provided toward the rear side.

The locating rib 9 with a certain length linearly extends from the wall face of the rib 6 toward the opening 3. The display panel 5 is housed in a space surrounded by the leading edge of each locating rib 9. The leading edge of each locating rib 9 substantially abuts on and is perpendicular to the side face of the display panel 5.

A drop test is performed to examine the strength thereof in a process from manufacture to shipment of a television. When a product is dropped for the test, the boss 7 fixing the display panel 5 to the front cabinet 1 is subjected to a large load because the display panel 5 is heavier than other components forming the television. If the boss 7 is cracked or broken at the time of the drop test, the product is rejected.

As described above, therefore, the reinforcing rib 8 is formed on the boss 7 to strengthen the boss 7 per se. However, it is not easy to concentrate the reinforcing rib 8 on the boss 7 in terms of the structure of a mold used when the front cabinet 1 is molded with resin. Actually, the greater the number of the reinforcing ribs 8, the greater difficulty in molding the front cabinet 1, which more easily causes defects in mold around the boss 7 such as a cavity inside resin. For this reason, the locating rib 9 is formed to prevent the boss from being broken independently of the number of the reinforcing ribs 8. That is to say, the locating rib 9 substantially prohibits the display panel 5 from moving inside the front cabinet 1 due to the shock of drop to reduce a load exerted on the boss 7.

However, a conventional structure has the following problems.

The locating rib 9 serves to forcibly prohibit the display panel 5 from moving inside the front cabinet 1 due to the external shock to the television receiver. However, the linear locating rib 9 is apt to directly transmit the external shock to the display panel 5, which resultantly transmits a large shock to the display panel 5 per se.

BRIEF SUMMARY OF THE INVENTION

The present invention discloses a television and a rib structure capable of minimizing an external shock such as drop transmitted to major components such as a display panel inside a cabinet for a product and preventing bosses fixing the major components to the inside of the cabinet from being cracked or broken.

A rib structure according to the present invention is formed at a predetermined position inside a cabinet and around a display panel housed in the cabinet. Specifically, the rib structure includes a first rib portion and a second rib portion. The first rib portion is a substantially linear rib one end of which is opposed to a side face of the display panel. The second rib portion is substantially U-shaped (horseshoe shaped) and connected to an other end of the first rib portion at the nearly bottom position of the U-shape. The two ends of the U-shape are connected to a wall face inside the cabinet.

That is to say, according to the present invention, since the second rib portion is substantially U-shape, the second rib portion absorbs shock exerted from the outside to the cabinet to significantly reduce shock at one end of the first rib portion transmitted to the display panel of which position is regulated in the cabinet.

The first rib portion may have a shape into which a corner of the one end is cut down obliquely (diagonally). Such a shape into which the corner of the one end is cut down obliquely enables the display panel to be easily guided to a space when the display panel is housed in the space inside the cabinet surrounded by the rib structure.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 4 is a rear view illustrating a conventional front cabinet.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, such variations and alternate embodiments are contemplated, and can be made without departing from the spirit and scope of the invention.

One embodiment of the present invention is described below with reference to the drawings.

Figure 1:
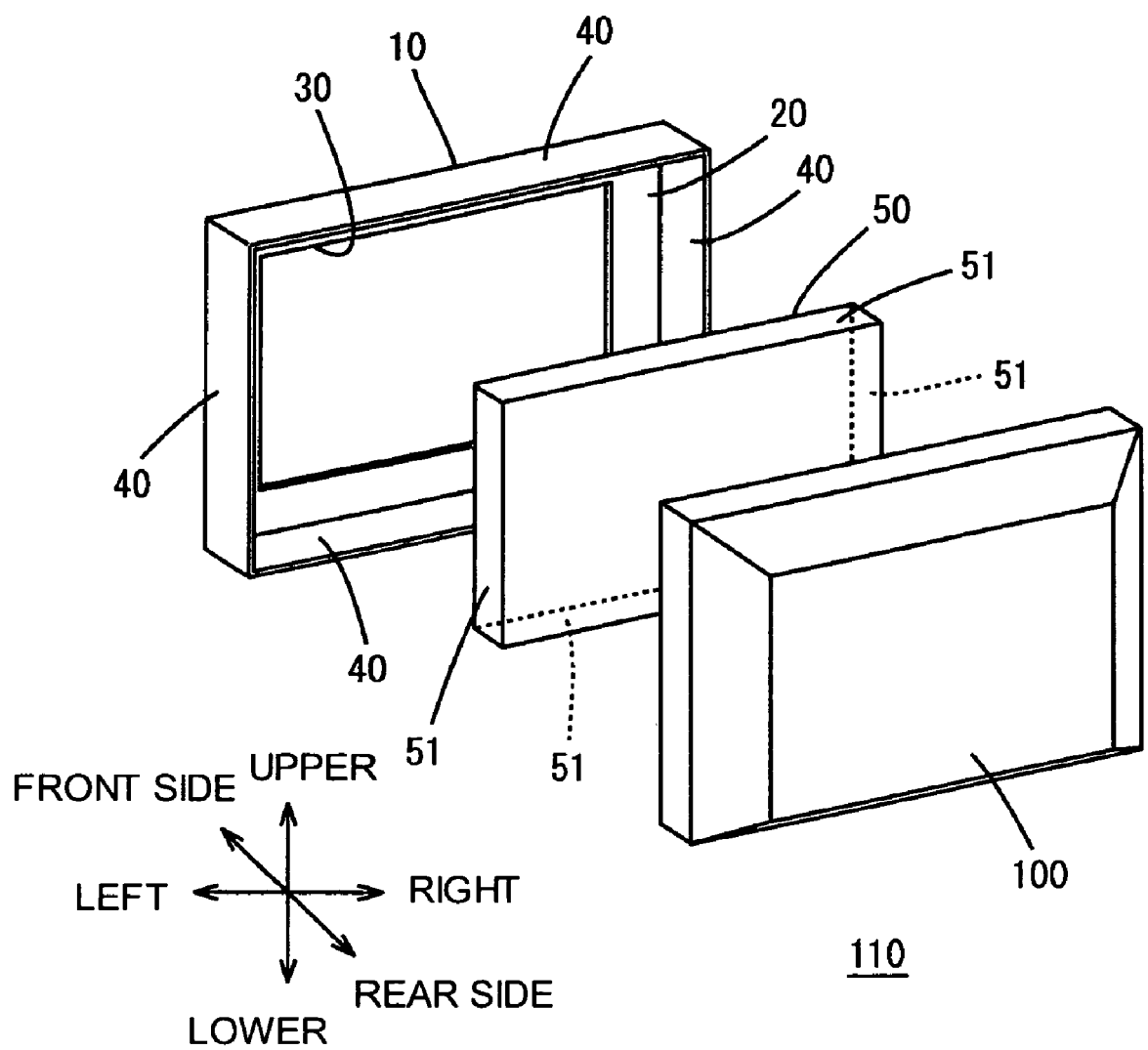
FIG. 1 is a rear perspective view illustrating one example of a schematic structure of a television receiver.

FIG. 1 is a rear perspective view schematically illustrating the structure of a television according to the present embodiment. A television 110 houses a display panel 50 inside a cabinet composed of a front cabinet 10 and rear cabinet 100. The front cabinet 10 and rear cabinet 100 are molded with resin. Various types of panels such as a liquid crystal panel or plasma display panel may be used as the display panel 50.

It is to be understood that the cabinet houses known various kinds of circuits and substrates achieving functions of a television such as a tuner circuit, video and audio signal processing circuits, driving circuit for the display panel 50, power supply circuit and loudspeaker as well as the display panel 50, which are not shown in the figure.

Figure 2:
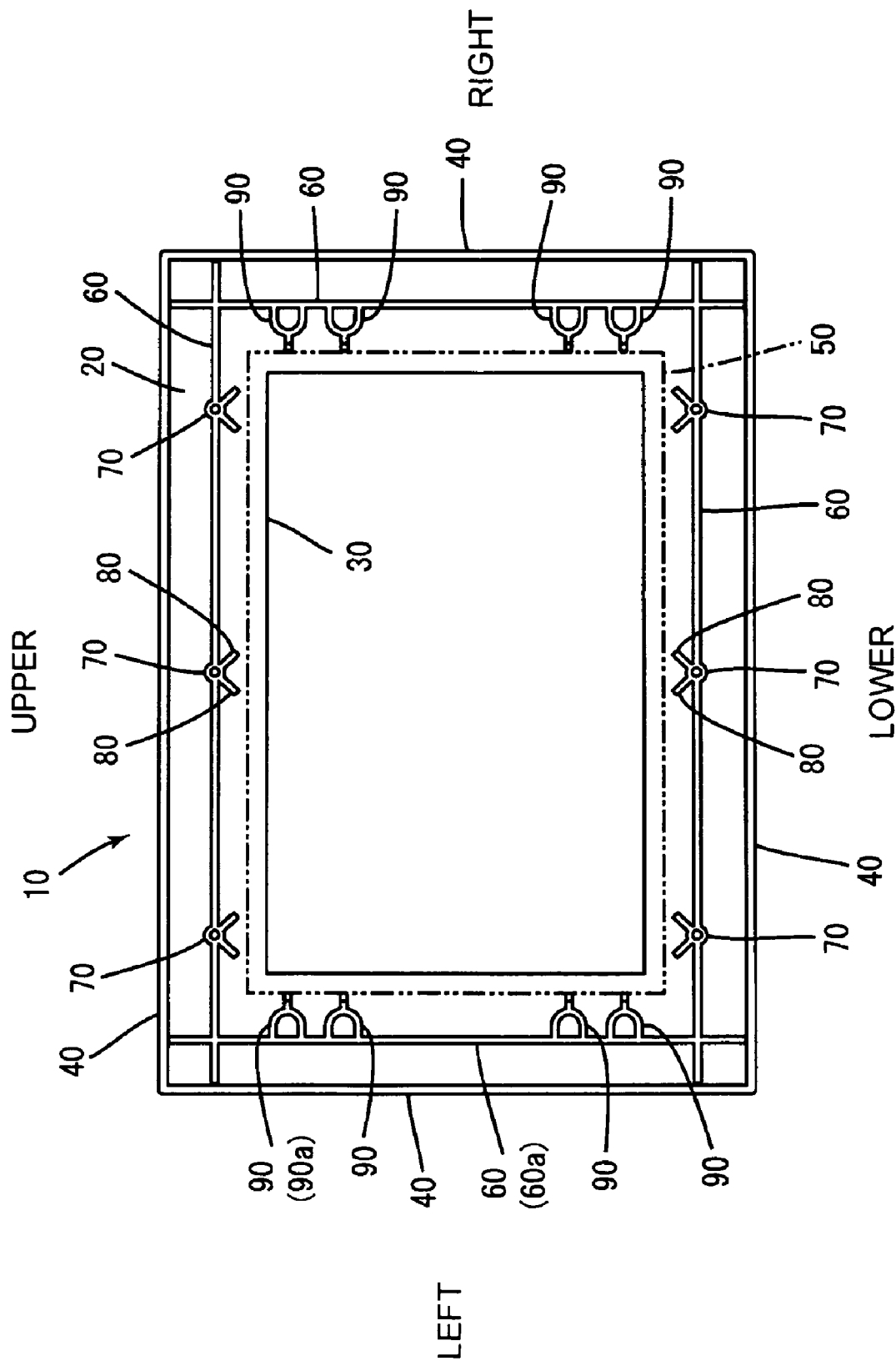
FIG. 2 is a rear view illustrating one example of a front cabinet.

FIG. 2 is a schematic rear view illustrating the inside of the front cabinet 10. As is the case with the conventional configuration illustrated in FIG. 4, the front cabinet 10 also includes a front face 20, opening 30 and upper, lower, left and right side faces 40. On the back side of the front face 20 are uprightly provided a rib 60 formed around the periphery of the opening 30 in substantially parallel with the upper, lower, left and right straight lines of the opening 30, boss 70 formed at several places on the rib 60 and reinforcing rib 80 formed on the outside face of the boss 70 to reinforce the boss 70. As is the case with a conventional display panel, the display panel 50 is also fixed to the inside of the front cabinet 10 with the screen of the display panel 50 exposed to the outside from the opening 30. In FIG. 2, as is the case with FIG. 4, a two-dot chain line indicates where to house the display panel 50 in the front cabinet 10.

Incidentally, sheet metals (not shown) are fixed to the upper and the lower side faces 51 of the display panel 50. The display panel 50 is fixed to the front cabinet 10 such that screw holes formed in the sheet metals are screwed to screw holes formed in the bosses 70.

A locating rib 90 is formed at several places on the rib 60 on the side of the opening 30 of the front cabinet 10. The rib structure according to the present invention is realized by the locating rib 90. The number of the locating ribs and places where to provide them are optional. In the present embodiment, an example is described where the locating ribs 90 are formed at several places on the wall face of the left and the right rib 60 opposed to the left and the right side faces 51 of the display panel 50.

Figure 3:
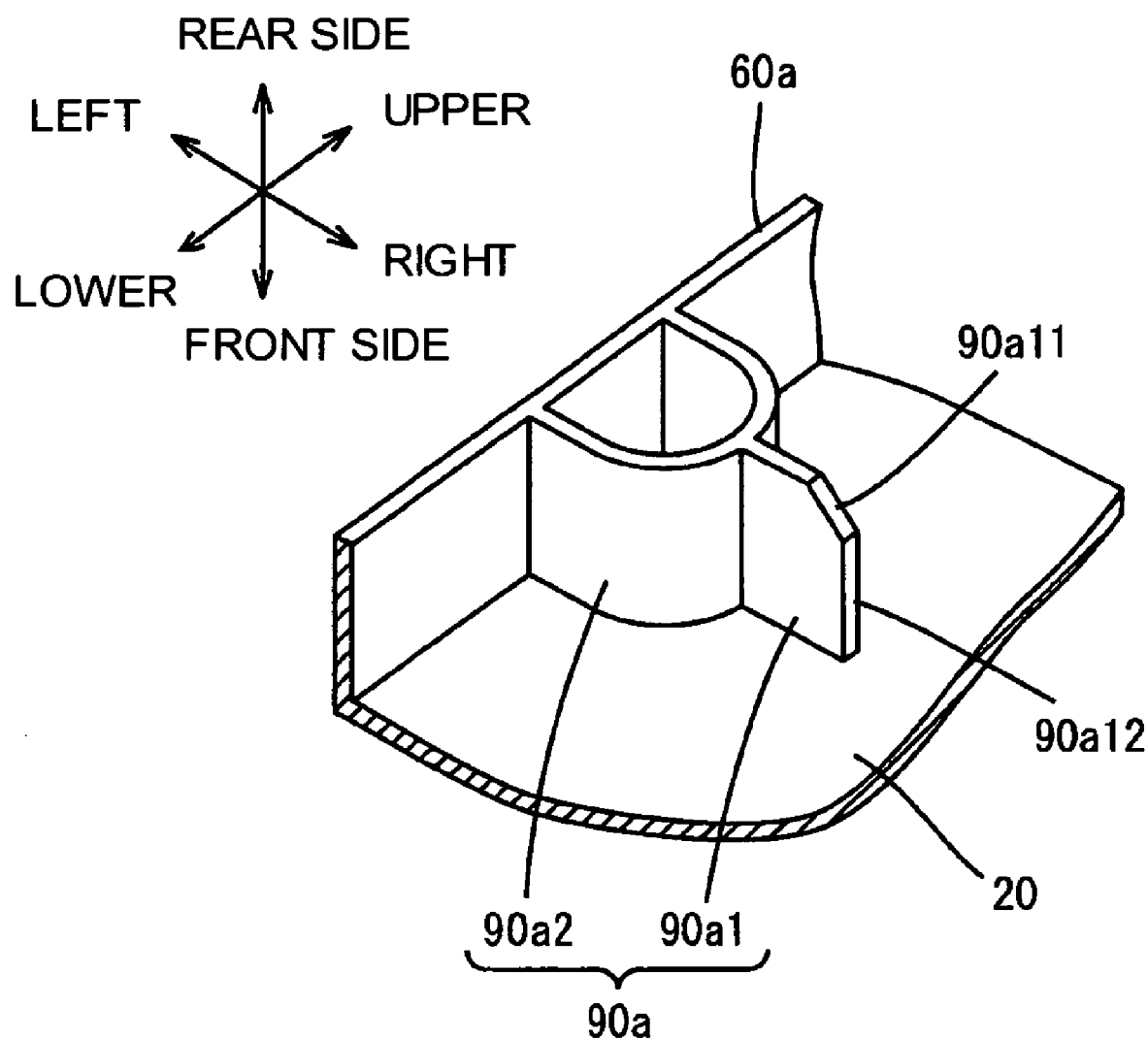
FIG. 3 is a perspective view illustrating one example of a locating rib.

FIG. 3 is a perspective view illustrating the shape of the locating rib 90.

The figure illustrates the left rib 60 (rib 60a) out of the upper, lower, left and right ribs 60 and one locating rib 90 (locating rib 90a) out of a plurality of locating ribs 90 uprightly provided from the back side of the front face 20 toward the rear side of the television 110 and integrally formed with the rib 60a. The other locating ribs 90 are the same as the locating rib 90a in shape.

The locating rib 90a is integrally composed of a first rib portion 90a1 and a second rib portion 90a2.

The second rib portion 90a2 is of such a shape that a stretch of wall is substantially U-shaped or substantially semicircular (referred to as "substantially U-shaped"). The two ends of the second rib portion 90a2 (two ends of U-shape) are connected to the wall face of the rib 60a. In other words, forming the second rib portion 90a2 into the substantially U-shape provides the locating rib 90 with shock absorbability.

The first rib portion 90a1 is of substantially linear and extending from the nearly bottom position of the U-shape of the second rib portion 90a2 in the direction approximately perpendicular to the wall of the rib 60a. The first rib portion 90a1 is opposed nearly perpendicularly to the left side face 51 of the display panel 50 and the leading edge face 90a12 thereof (corresponding to "one end" in the claim) substantially abuts on the left side face 51. Incidentally, the expression "to substantially abut" refers to both cases where the leading edge face 90a12 is brought into contact with the side face 51 and the leading edge face 90a12 is not brought into contact with the side face 51, however, extremely close to the side face 51. In either case, as illustrated in FIG. 2, the display panel 50 is stuck in an area surrounded by the first rib portions of a plurality of the locating ribs 90.

According to the present invention, as described above, the locating rib 90 regulating the movement of the display panel 50 fixed to the bosses 70 formed on the back side of the front face 20 of the front cabinet 10 and housed corresponding to the opening 30 is composed of the first rib portion 90a1 that is substantially linear and one end substantially abuts on the side face 51 of the display panel 50 and the second rib portion 90a2 that is approximately U-shaped and connected to the other end of the first rib portion 90a1 at the nearly bottom position of the U shape and the two ends of the U shape are connected to the wall face of the rib 60 uprightly provided at the back side of the front face 20.

For this reason, if the television 110 is subjected to shock from the outside at the time of performing a drop test or the like, the second rib portion 90a2 of the locating rib 90 momentarily deforms to absorb shock, enabling significantly reducing a load transmitted to the display panel 50 being precision instrument.

The locating rib 90 prohibits the display panel 50 from moving inside the front cabinet 10. For this reason, if the television 110 is subjected to the shock, a load given to the boss 70 fixing the display panel 50 to the front cabinet 10 is also reduced to prevent the boss 70 being cracked or broken.

A slant face 90a11 which slants from the rear to the front side of the television 110 is formed on the corner portion of the rear side of leading edge face 90a12 of the first rib portion 90a1. That is to say, the corner of the leading edge face 90a12 is cut diagonally. The display panel 50 is inserted into the front cabinet 10 from the rear side thereof Forming the above slant face 90a11 in advance on the leading edge face 90a12 enables easily housing the display panel 50 in a position surrounded by a plurality of the first rib portions.

According to the above configuration, a television, comprising a rib structure formed at positions around a display panel housed in a cabinet, the television, wherein the rib structure is integrally formed with a first and a second rib portion uprightly provided toward a rear side of the television on a back side of a front face of the cabinet at a substantial center of which an opening is formed to expose a screen of the display panel to the outside, the first rib portion is substantially linear, one end thereof substantially abuts approximately perpendicularly to a left side face and a right side face of the display panel housed in the cabinet corresponding to a position of the opening and the first rib portion has a shape into which a corner of one end is cut from the rear side toward a front side of the television, and the second rib portion is substantially U-shaped and connected to an other end of the first rib portion at a nearly bottom position of the U-shape and two ends of the U-shape are connected to a wall face of other ribs uprightly provided in substantially parallel with the left side face and the right side face of the display panel and toward the rear side of the television on the back side of the front face of the cabinet.

That is to say, the rib structure achieves the same action and effect also in a concrete product being a television as the foregoing rib structure. The rib structure is applicable to any cabinet as long as a cabinet is used for housing major components such as a display panel.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A television, comprising:
    a rib structure formed at positions around a display panel housed in a cabinet;
    the rib structure includes ribs that are positioned on a back side of a front face of the cabinet, formed around a periphery of an opening that is substantially parallel with an upper, lower, left and right straight lines of the opening;
    the rib structure is further integrally formed with a first and a second rib portion uprightly provided toward a rear side of the television on the back side of the front face of the cabinet at a substantial center of which the opening is formed to expose a screen of the display panel to the outside,
    the first rib portion is substantially linear, and includes a first leading edge that is substantially perpendicular to the back side of the front face, and substantially abuts approximately perpendicularly to a left side face and a right side face of the display panel housed in the cabinet corresponding to a position of the opening, a second edge that contacts the second rib portion, a third edge that has an orientation normal to the first leading edge and the second edge and faces the rear side of the television, and a fourth slanted edge that is straight and positioned at an oblique orientation between the first leading edge and the third edge, and when the display panel is housed in the cabinet corresponding to the position of the opening, the fourth slanted edge is positioned away from and outside of the opening, while first leading edge substantially abuts the display panel, with the fourth slanted edge enabling the positioning of the display panel in a position surrounded by plurality of the first rib portions;
    the second rib portion is substantially U-shaped, with an outer curve of the U-shaped second rib portion contacting the second edge of the first rib portion at a nearly bottom position of the outer curve of the U-shape and two ends of the U-shape contacting the ribs, with the two ends of the U-shape connected to a wall face of the ribs uprightly provided in substantially parallel with the left side face and the right side face of the display panel and toward the rear side of the television on the back side of the front face of the cabinet;
    the two ends of the second rib portion absorb external shock by deforming, with the shock dissipated at the nearly bottom position of the outer curve of the U-shape of the second rib portion and the second edge of the first rib portion, preventing direct transmit of the external shock to the display panel.

2. A rib structure formed at positions around a display panel housed in a cabinet, comprising:
    ribs that are positioned on a back side of a front face of the cabinet, formed around a periphery of an opening that is substantially parallel with an upper, lower, left and right straight lines of the opening;
    a first rib portion and a second rib portion;
    the first rib portion that is substantially linear and has a first leading edge that is substantially perpendicular to the back side of the front face and is opposed to a side face of the display panel, a second edge that contacts the second rib portion, a third edge that has an orientation normal to the first leading edge and the second edge and faces a rear side of the cabinet, and a fourth slanted edge that is straight and positioned at an oblique orientation between the first leading edge and the third edge; and when the display panel is housed in the cabinet corresponding to a position of the opening, the fourth slanted edge is positioned away from and outside of the opening, while first leading edge substantially abuts the display panel, with the fourth slanted edge enabling the positioning of the display panel in a position surrounded by plurality of the first rib portions;
    the second rib portion is substantially U-shaped, with an outer curve of the U-shaped second rib portion connected to the second edge of the first rib portion at a nearly bottom position of the outer curve of the U-shape and two ends of the U-shape being connected to a wall face of the cabinet; and
    the two ends of the second rib portion absorb external shock by deforming, with the shock dissipated at the nearly bottom position of the outer curve of the U-shape of the second rib portion and the second edge of the first rib portion, preventing direct transmit of the external shock to the display panel.

* * * * *